Figure 1:
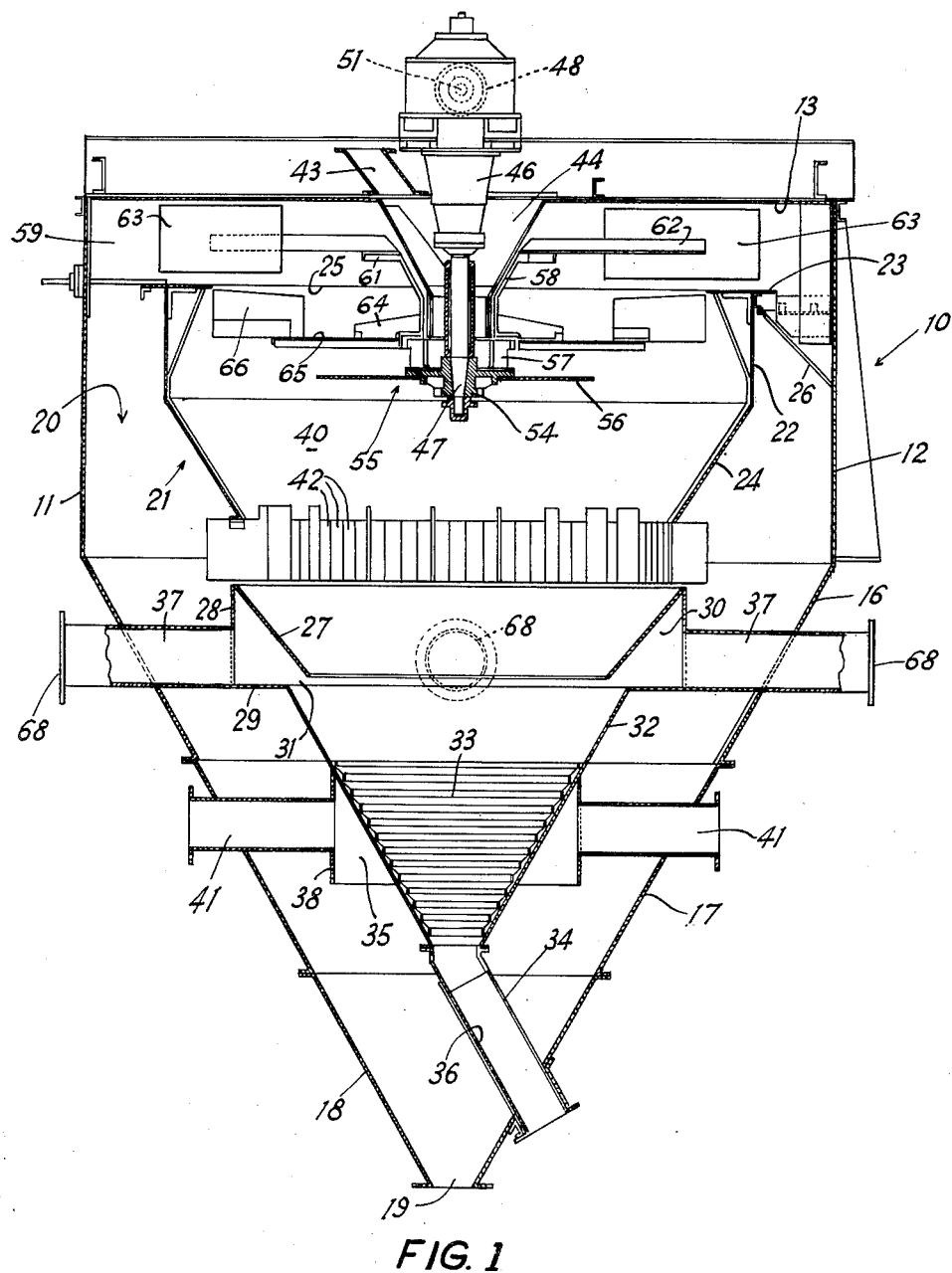

Nov. 10, 1953     G. B. EBERSOLE     2,658,615
SEPARATOR DRYING METHOD AND APPARATUS
FOR MOISTURE CARRYING MATERIAL

Filed March 19, 1949     2 Sheets-Sheet 1

INVENTOR
George B. Ebersole
BY
ATTORNEY

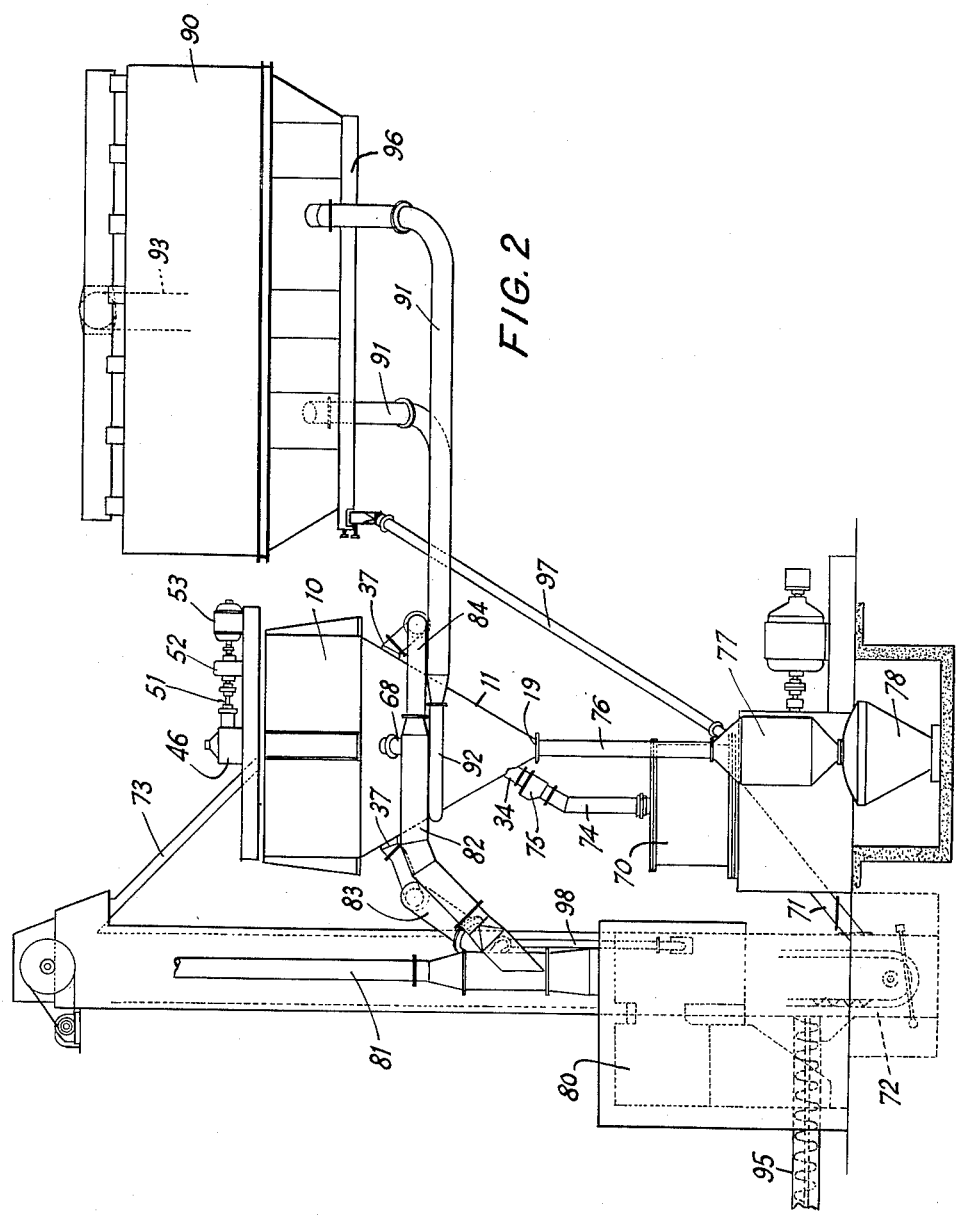

Patented Nov. 10, 1953

2,658,615

UNITED STATES PATENT OFFICE 2,658,615

SEPARATOR DRYING METHOD AND APPARATUS FOR MOISTURE CARRYING MATERIAL

George B. Ebersole, Westfield, N. J., assignor to The Babcock & Wilcox Company, Rockleigh, N. J., a corporation of New Jersey Application March 19, 1949, Serial No. 82,382

12 Claims. (Cl. 209—11)

This invention relates to separators employed in closed circuit pulverizing systems for moisture carrying material and, more particularly, to an improved arrangement whereby a gaseous medium is brought into intimate heat exchange relation with separated coarse particles being passed from a material classifying zone to a pulverizer.

In the type of separator to which the present invention is applicable, a separating chamber and a surrounding collecting chamber are in communication through top and bottom openings, the latter generally comprising air louvres in the separating chamber wall. A main circulating fan above the top opening causes air to circulate in a closed circuit upwardly through the separating chamber, into and downwardly through the collecting chamber, and back into the separating chamber through the louvres. The material to be graded is introduced into the separating chamber and centrifugally into the path of the rising air current. The fines, or that part of the material that can be lifted by the air stream and flow through rejective means, such as a fan, located between the zone of distribution and the top opening of the separating chamber, pass into the collecting chamber to be delivered through an outer cone to a fines outlet. The tailings, or rejected heavier particles, gravitate or cascade downwardly past the bottom or air inlet opening of the separating chamber and along the interior surface of an inner inverted cone to a tailings chute or outlet.

The present invention is directed to such a separator in which the coarse particles are subjected to a two-stage heat exchanging action. In the first stage, the particles are subjected to the heat exchange action of circulating air flowing into the separation zone through the louvres. Below the louvres, the particles are subjected to a gaseous medium having a high velocity and introduced into the tailings cone in the form of an annular stream which flows downwardly through the tailings moving along the inner surfaces of the cone. The scrubbing action of the gaseous medium effects a further separation of fines clinging to the tailings. Dependent upon its relative temperature, the gaseous medium may be designed to exert either a heating and moisture absorbing action on the particles or a cooling action thereon and on the separator elements.

If the gaseous medium is to perform a heating and moisture absorbing action, the relatively hot gaseous products of combustion from a furnace or boiler are injected at a relatively high velocity through a downwardly opening annular slot into the separator inner cone below the louvres or inlet opening between the separating and collecting chamber. The annular stream of hot gases flows downwardly through the falling tailings moving along the inner surface of the cone, before passing substantially centrally upwardly through the cone, as a result of velocity dissipation, and are then drawn through the rejective means and through the top opening into the collecting chamber by the separator fan. The gases flow downwardly through the latter and are discharged at a relatively low velocity and with a reversal of flow direction into an annular interior hood arrangement and thence into pipes or conduits leading to the dust separator. Induced draft fans at the latter discharge the gases to the stack.

With such arrangement, the tailings are in contact, immediately after separation, with the circulating air, and are then in contact with the hot gas or air stream for a relatively long interval while flowing along the tailings cone inner surface. As a result of such two-stage drying action, the tailings have a considerable amount of their moisture removed before their passage to the pulverizer, thus effecting a substantial decrease in the moisture content of the material being pulverized. Such decrease in moisture content increases the efficiency of the pulverizing and separating actions. Additionally, the hot gas or air stream has a substantial drying effect on the fines passing through the collecting chamber and on fines removed from the tailings by the scrubbing action.

If a cooling action is desired, a low pressure fan may be used to force atmospheric air through the annular slot into the separator inner cone, or the slot may be open to the atmosphere and air drawn therethrough by suction due to less than atmospheric pressure in the separator.

With the foregoing in mind, it is an object of the present invention to provide an improved, closed circuit pulverizer heat exchange system.

Another object is to provide an improved separator for use in a closed circuit pulverizing system for moisture bearing material.

A further object is to provide such a separator in which the coarse particles are subjected to a two-stage heat exchange action with the second stage being effected by an introduced stream of gaseous medium.

These and other objects, advantages and novel features of the invention will be apparent from the following description and the accompanying drawings. In the drawings:

Fig. 1 is a central, vertical sectional view through a centrifugal air circulation separator incorporating the invention; and Fig. 2 is a side elevation view of a closed circuit pulverizer drying system incorporating the separator of Fig. 1.

Referring first to Fig. 1 of the drawing, the separator 10 shown therein, as an illustrative type of air separator in which the invention may be embodied, includes an outer casing 11 having an upper drum shape portion comprising a cylindrical wall 12 closed by a flat circular upper head 13. The lower portion is conical and includes a first section 16 connected by an intermediate section 17 to a lower section 18 terminating in a fines discharge spout 19.

Within, and spaced from, outer casing 11 to form therewith an annular fines collecting chamber 20, is an inner casing 21 including an upper drum shape portion comprising a cylindrical wall 22 having a flat annular upper flange or marginal head providing a centralized outlet or top opening 25. Wall 22 is continued in an inverted conical wall or shell 24, and inner casing 21 may be supported on outer casing 11 by means of brackets 26. In vertically spaced relation to shell 24, is a subjacent inverted conical shell 27 integral with an embracing, and somewhat axially longer, cylindrical shell 28 having a lower, flat annular flange 29 extending inwardly toward shell 27 but terminating in spaced relation thereto. Shells 27 and 28, and flange 29, cooperatively form a manifold or chamber 30 having an annular discharge slot 31 directed downwardly into tailings discharge cone 32.

Tailing scone 32, which is connected to the inner periphery of flange 29, has a corrugated lining 33 and terminates in a tailings chute 34 directed laterally through casing section 18 and having a liner 36 of cast iron or similar material.

A series of angularly spaced relatively large conduits or pipes 37, shown as four in number, extend from chamber 30 in gas tight relation across the annular collecting space 20 and through the outside casing 11 to flanges 68. Intermediate its ends, inverted cone 32 is secured in gas tight relation to a pendant cylindrical wall 38, forming a downwardly opening manifold or chamber 35 in collecting chamber 20. Manifold 35 is in communication with the exterior of outer casing 17 through a series of angularly spaced pipes or conduits 41, shown as four in number which act as a means of withdrawing air uniformly from the manifold. This averages the air flow, reducing it to a minimum velocity, and avoids excessive carryoff of the finished product and undesired loading of the dust collector.

The central space extending downwardly from the rotary distributor 55 to the tailings chute 34, as defined by the inverted cone 24, a circular row of angularly positioned louvres 42, the inverted cone 27 and the inverted cone 32, provides a cavity for inward recirculated air introduction through the louvred opening, as well as a subjacent and axially spaced annular slot 31 for introduction of a heat exchange medium. This space thus is essentially a coarse material heat exchange zone or chamber as indicated at 40.

The materials to be graded or classified are delivered through an inclined delivery chute 43 into a conical feed hopper 44 depending from head 13 and having a lower cylindrical neck extending centrally into separating chamber 40 through its upper opening 25. A housing 46 on head 13 extends centrally into hopper 44 and carries spaced bearings (not shown) supporting a vertical shaft 47 which has a bevel gear (not shown) on its upper end meshing with a bevel pinion 48 on a shaft 51. The latter is coupled to the output of a gear reducer 52 having its input coupled to a motor 53, all suitably supported on the head 13 of separator 10, as shown in Fig. 2.

The lower end of shaft 47 carries a hub 54 to which are secured plates 56 providing a rotary distributor 55 in the lower portion of the classifying zone. Posts 57 extend upwardly from hub 54 to support a sleeve 58 surrounding hopper 44 and extending into a chamber 59 between plate 13 and flange 23, and communicating with collecting chamber 20. The upper end of sleeve 58 has a flange 61 supporting arms 62 carrying circulating fan blades or vanes 63. Arms 64 on the lower end of sleeve 58 carry a circular rotary baffle 65 having rejector fan blades or vanes 66 extending from its periphery, the vanes 66 having their upper edges disposed immediately beneath flange 23.

The separator 10 operates in the usual manner to classify material entering through delivery chute 43. This material falls through hopper 44 around housing 46 and onto rotary distributor 55 which introduces the material centrifugally into the rising air stream in separating chamber 40 effected by rotation of circulator fan blades 63. Some particles above a predetermined size or weight, which are not affected by the centrifugal separation action induced by the discharge from rotary distributor 55, are carried upwardly past baffle 65. The rotary rejector fan blades subject these particles to a centrifugal force causing the coarser particles to be thrown radially outward against the wall 22, from whence they gravitate or cascade along this wall and along conical wall 24. The heavier particles thrown off rotary distributor 55 likewise gravitate along walls 22 and 24, and all the rejected particles gravitate past louvres 42 and along conical wall 27 onto the inner surface of tailings cone 32. The particles flowing along the surface of cone 32 pass out through tailings discharge chute 34.

The smaller or lighter particles of an acceptable size, called "fines," are carried out by the air stream. These fines pass through both sets of fan blades 66 and 63 into chamber 59 and thence into the annular fines collecting chamber 20 where separation from the air stream occurs so that the fines are discharged through spout 19 and a portion of the air continues its circulation. The path of air flow through the circulator fan is outwardly into annular fines collecting chamber 20, then a portion flows inwardly through separating chamber 40 to the material feed zone, while the remainder passes downwardly for discharge in a manner described hereinafter. All of the downwardly gravitating material is subjected to a first stage heat exchange action, by the air entering louvres 42 and flowing upwardly toward the separation zone, as the material gravitates along walls 22 and 24.

The gaseous medium for the second stage of the heat exchange action is introduced through inlet nozzles 37 into internal chamber or manifold 30. Shell 27 in cooperation with annular slot 31 forms a nozzle directing a relatively high velocity annular stream of air or gas downwardly along the inner surface of cone 32. The stream exchanges heat with the tailings gravitating along this surface, and expands to decrease its velocity. The stream then flows upwardly through the central part of cone 32, along the inner surfaces of cones 27 and 24 and drum 22, through rejector fan blades 66 and circulating fan blades 63, and into chamber 59. The air and/or gaseous medium flow is then downwardly through collecting chamber 20, with a portion of the flow reentering the heat exchange zone 40 through louvres 42 and the remainder continuing to flow downwardly and finally reverse the flow direction to enter annular outlet chamber 35. The stream is withdrawn from chamber 35 through the pipes 41.

In accordance with the present invention, the material fed into the rising stream of gaseous medium circumferentially of distributor 55 consists of the raw material fed to the system, as well as the output of the pulverizer which has been subjected to pulverizer action. The materials of proper fineness, whether originating with the raw feed or from the pulverizer output, are carried out of the separation zone with the stream to be separated and collected in space 20. Fines originating in the raw material feed are subjected to the relatively hot material in the circulating load, and are thus at an elevated temperature before being placed in heat exchange relation with the gaseous medium.

The coarse particles, which are rejected from the gaseous medium stream by centrifugal action, gravitate downward, particularly along the walls of shell 22 and the inverted cone 24, to drop across the recirculated air passing inward through the annular louvred space, and the particles are thus first subjected to the heat exchange action of the recirculated stream entering zone 40 through louvres 42. On gravitating still further, inverted cone 27 directs them into the downwardly and inwardly directed stream of gaseous medium from the annular slot 31. In the case of a drying heat exchange action, this stream is of substantially higher temperature than that of the recirculated air, so that the coarse particles are subjected to a second stage of drying as they reach the zone below the louvres in which the hot medium from the annular slot is initially effective.

Drying action to which the coarse particles are thus subjected may be characterized as taking place in two steps or stages, with the final step being with gaseous medium at substantially higher temperature so that the coarse particles being delivered by the tailings chute 34 will be adequately dried to permit more efficient pulverization in the pulverizer.

To effectively provide the second stage of heat exchange in the invention arrangement, the gaseous medium is introduced throughout the periphery of the coarse particles heat exchange and collecting zone with a scrubbing velocity relationship. The scrubbing action of the introduced high velocity stream of gaseous mediums effects a further fines separation by removing fine particles still clinging to the gravitating coarse material.

The means for providing the hot air or gas stream, when the invention arrangement is used for material heating and drying, and the pulverizer and other elements associated with separator 10 in the closed circuit pulverizer drying system, are shown in Fig. 2. Referring to this figure, the raw material to be ground and classified is fed by a screw conveyor 95 to the base of an elevator conveyor 72. At the top of elevator 72, the material is delivered by a spout 73 to the delivery chute 43 of separator 10, and the tailings leaving tailings chute 34 of the separator flow into a chute 74 leading to a pulverizer 70 and having a tailings valve 75. The collected fines from collecting chamber 20 flow through discharge outlet 19 into a spout 76 leading to a receiving chamber 77 in communication with a conveyor tank 78. The ground material from pulverizer 70 is discharged through a spout 71 to the base of elevator 72.

The hot gases for the drying stream are provided by a furnace 80 having a stack 81. Just above the base of the stack, a pair of pipes 82, 83 branch off from the stack, and each pipe is connected to two of the inlet nozzle flanges 68, the pipes being suitably reduced in cross section beyond their first connection to a nozzle 37, as indicated at 84. The hot gases entering through nozzles 37, as previously described, flow therethrough into chamber 30 from which they are discharged as an annular stream downwardly along the surface of tailings cone 33 at a relatively high velocity by the nozzle provided by shell 27 in cooperation with annular slot 31. In cone 33, the hot gases exert a drying and scrubbing action on the gravitating tailings flowing along the cone surface, and then reverse direction to flow up through the cone and through the drying and classification zones, the upward flow being assisted by the circulator fan. During this time, the hot gases are in contact with the downflowing tailings and remove moisture therefrom, so that the recirculated tailings discharged to pulverizer 70 are progressively lower in moisture content.

During their travel through the tailings, the gases continually lose velocity, and to insure their velocity being reduced to such a low value as to substantially preclude carry-off of fines by the hot gas stream, a relatively long path of flow is provided in collecting chamber 20. Thus, before exiting from the separator, the hot gases flow downwardly nearly the full length of chamber 20, and then flow upwardly into chamber 35. This flow reversal assists in effecting a gravitational separation from the gas stream.

To recover any fines carried into chamber 35, a pair of pipes 91, 91 have branches 92, 92 each connected to an outlet nipple 41, and the pipes conduct the hot gases from separator 10 to a dust collector 90 having a gas outlet 93 leading to an induced draft fan discharging the gases into a stack. The fines separated from the gases in bag type dust collectors 90 are removed by a screw conveyor 96 which discharge into spouts 97 leading to receiver tanks 77. Thus, substantially all of the fines are delivered to the receiver tanks. Elevator 72 is vented by a pipe 98 connecting the elevator, above the connection of pipes 82, 83, to the stack.

The important features of the present invention, when used for the relatively high temperature drying of pulverizable material, include the preheating of the raw material by admixing with the high temperature circulating load, the drying action by the recirculating air stream reentering chamber 40 through louvres 42, and the drying and scrubbing action by the high velocity stream of high temperature gaseous medium directed downwardly through cone 32. The mechanical features for accomplishing these effects include the means for feeding raw material to the base of elevator conveyor 72, the circumferential hot gas inlet which is positioned below the louvred circulating gas inlet, and the circumferential gas outlet in the annular collecting chamber below the level of the hot gas inlet to the inner separating chamber. The supply of gas to the inlet by a plurality of circumferentially spaced supply ducts assures an inlet stream of substantially uniformly distributed volume and uniform velocity. Likewise, the plurality of circumferentially spaced gas withdrawal connections from the gas outlet manifold provides for uniform velocity of the upward flow into the outlet manifold.

When the invention arrangement and apparatus is used for a material cooling heat exchange, a low pressure fan may be used to deliver atmospheric air to pipes or conduits 37 for discharge through annular slot 31 downwardly through the tailings gravitating along the inner surface of cone 32. The air stream, as it loses its velocity, is drawn upwardly through the separator in the same manner as described for the high temperature drying arrangement. As the interior of separator 10 is usually maintained under a negative pressure, cooling atmospheric air may be introduced through annular slot 31 by leaving pipes or conduits 37 open to the atmosphere, as shown in Fig. 1.

A typical commercial installation embodying the invention system for heating, drying and grinding raw material for cement has a high hourly output of relatively dry pulverized material even though the raw material feed has a high moisture content. The raw material feed comprises limestone, shale and clay. The respective moisture contents are 2%, 4% and 15%, and the overall moisture content of the mixture is approximately 3.5%. To obtain 100 lbs. (dry basis) of finished material containing 89.57% limestone, 4.9% shale and 6.24% clay, 91.80 lbs. of limestone, 5.14 lbs. of shale, and 7.34 lbs. of clay are fed to screw conveyor 95. 3.53 lbs. of water are eliminated from the mixture for each 100 lbs. of finished material, leaving 0.75% of moisture in such material.

To accomplish this, the induced draft fan on dust collector 90 has a capacity of 16,800 cu. ft./min. at 140° F., and elevator 72 has a capacity of 250 tons/hr. of material weighing 100 lbs./cu. ft. The circulating load of the system is thus 250 tons/hr., and with gases discharged from inlet manifold 30 at 700° F. and 70 ft./sec., the output is 38.9 tons/hr. of finished material. The apparatus can handle a feed of limestone, shale and clay having respective moisture contents of 10%, 10% and 20%. In such case the circulating load remains constant but the rate of output of finished material is reduced due to the longer circulation time required to reduce the moisture content to the desired minimum level.

While a specific embodiment of the invention has been shown and described in some detail to illustrate the application of the invention principles, it will be understood that the invention may be otherwise embodied without departing from such principles.

I claim:

1. Means for treating moisture-containing pulverizable material comprising means for separating fine material from the remainder of the material; means forming a heat exchange zone; means for cascading an elongated annular stream of separated coarser particles of the material through said heat exchange zone; means for circulating a gaseous medium in heat exchanging relation through the cascading coarser particles in the initial section of said zone; and means operative, in a further section of said zone, to direct an additional and annular stream of gaseous medium, at a substantial initial pressure and velocity, in the same general initial direction as and in a relatively elongated path through the stream of coarser particles to scrub fines from such coarser particles; said circulating means reversing the direction of flow of such stream, as the initial pressure and velocity of such stream are substantially dissipated near the downstream end of such further section, to draw such stream centrally through said zone to said separating means to remove from such stream the fines scrubbed from such coarser particles.

2. Means for drying moisture-containing pulverizable material comprising means for separating fine material from the remainder of the material; a drying zone; means for cascading separated coarser particles of the material through said drying zone; means for circulating a stream of moisture absorbing gaseous medium through the cascading coarser particles in an initial section of said drying zone; and means for subsequently directing a second and relatively high velocity stream of high temperature, moisture absorbing gaseous medium in a relatively elongated path in the same direction as and through the coarser particles in a following section of said drying zone.

3. Means for drying moisture-containing pulverizable material comprising means for separating fine material from the remainder of the material; means forming a drying zone; means for cascading an elongated annular stream of separated coarser particles of the material through said drying zone; means for circulating a moisture absorbing gaseous medium through the cascading coarser particles in the initial section of said zone; and means operative, in a further section of said zone, to direct a second and relatively high velocity annular stream of moisture absorbing gaseous medium initially longitudinally in a relatively elongated path in the same direction as and through the stream of coarser particles to scrub fines from such coarser particles; said circulating means reversing the direction of flow of such stream, as the initial pressure and velocity of such stream are substantially dissipated near the downstream end of such further section, to draw such stream centrally through said zone to said separating means to remove from such stream the fines scrubbed from such coarser particles.

4. Means for treating moisture-containing pulverizable material comprising means for separating fine material from the remainder of the material; a heat exchange zone; means for cascading an elongated annular stream of separated coarser particles of the material through said heat exchange zone; means for circulating a gaseous medium in heat exchanging relation through the cascading coarser particles in the initial section of said zone; and means operative, in a further section of said zone, to direct an additional and annular, high velocity stream of gaseous medium longitudinally in heat exchanging relation in a relatively elongated path through the stream of coarser particles and in the same initial direction as the movement of such coarser particles to scrub fines from and further dry such coarser particles; said circulating means reversing the direction of flow of such stream, as the initial pressure and velocity of such stream are substantially dissipated near the downstream end of such further section, to draw such stream centrally through said zone to said separating means to remove from such stream the fines scrubbed from such coarser particles.

5. Means for drying moisture-containing pulverizable material comprising means for separating fine material from the remainder of the material; means forming a drying zone; means for cascading an annular stream of separated coarser particles of the material through said drying zone; means for circulating a stream of moisture absorbing gaseous medium through the cascading coarser particles in an initial section of said drying zone; and means for subsequently directing a second and relatively high velocity annular stream of high temperature, moisture absorbing gaseous medium in a relatively elongated path in the same direction as and through the annular stream of coarser particles in a following section of said drying zone.

6. In a material separator of the type comprising an outer casing, an inverted conical inner casing within and spaced from said outer casing to define an annular collecting chamber therebetween communicating at its upper end with a separating chamber defined by said inner casing, circumferentially arranged openings intermediate the height of said inner casing and providing a gas connection between said chambers, solid material distributing means in the upper part of said separating chamber constructed and arranged to distribute solid material circumferentially of said separating chamber, draft producing means above said material distributing means and arranged to maintain a cyclic gas flow downwardly through the upper part of said collecting chamber, through said circumferentially arranged openings, and upwardly through the upper part of said separating chamber, whereby solid material fines will be carried into said collecting chamber and coarse material will drop along the inner side of said inner casing, the lower end of said inner casing constituting a tailings cone, an outlet for fines at the lower end of said collecting chamber, and an outlet for coarse material at the lower end of said tailings cone; means for treating the coarse material during its downward passage through said tailings cone comprising a gas inlet to said inner casing extending substantially throughout the entire circumference of said separating chamber at a level below said circumferentially arranged openings and above said tailings cone; a source of gas at a relatively high pressure connected to said inlet for discharge of gas at a relatively high velocity downward along the inner side of said tailings cone to effect an intimate heat exchange contact between the incoming gas and the descending coarse material in said tailings cone; and means forming a circumferentially extending gas outlet in said collecting chamber at a level below said gas inlet.

7. In a material separator of the type comprising an outer casing, an inverted conical inner casing within and spaced from said outer casing to define an annular collecting chamber therebetween communicating at its upper end with a separating chamber defined by said inner casing, circumferentially arranged openings intermediate the height of said inner casing and providing a gas connection between said chambers, solid material distributing means in the upper part of said separating chamber constructed and arranged to distribute solid material circumferentially of said separating chamber, draft producing means above said material distributing means and arranged to maintain a cyclic gas flow downwardly through the upper part of said collecting chamber, through said circumferentially arranged openings, and upwardly through the upper part of said separating chamber, whereby solid material fines will be carried into said collecting chamber and coarse material will drop along the inner side of said inner casing, the lower end of said inner casing constituting a tailings cone, an outlet for fines at the lower end of said collecting chamber, and an outlet for coarse material at the lower end of said tailings cone; means for treating the coarse material during its downward passage through said tailings cone comprising a gas inlet to said inner casing extending substantially throughout the entire circumference of said separating chamber at a level below said circumferentially arranged opening and above said tailings cone; a source of gas at a relatively high pressure connected to said inlet for discharge of gas at a relatively high velocity downward along the inner side of said tailings cone to effect an intimate heat exchange contact between the incoming gas and the descending coarse material in said tailings cone; means forming a circumferentially extending gas outlet in said collecting chamber; and means for withdrawing gas from said collecting chamber through said gas outlet.

8. In a material separator of the type comprising an outer casing, an inverted conical inner casing within and spaced from said outer casing to define an annular collecting chamber therebetween communicating at its upper end with a separating chamber defined by said inner casing, circumferentially arranged openings intermediate the height of said inner casing and providing a gas connection between said chambers, solid material distributing means in the upper part of said separating chamber constructed and arranged to distribute solid material circumferentially of said separating chamber, draft producing means above said material distributing means and arranged to maintain a cyclic gas flow downwardly through the upper part of said collecting chamber, through said circumferentially arranged openings, and upwardly through the upper part of said separating chamber, whereby solid material fines will be carried into said collecting chamber and coarse material will drop along the inner side of said inner casing, the lower end of said inner casing constituting a tailings cone, an outlet for fines at the lower end of said collecting chamber, and an outlet for coarse material at the lower end of said tailings cone; means for treating the coarse material during its downward passage through said tailings cone comprising a gas inlet to said inner casing extending substantially throughout the entire circumference of said separating chamber at a level below said circumferentially arranged opening and above said tailings cone; a source of gas at a relatively high pressure connected to said inlet for discharge of gas at a relatively high velocity downward along the inner side of said tailings cone to effect an intimate heat exchange contact between the incoming gas and the descending coarse material in said tailings cone; means forming a circumferentially extending gas outlet in said collecting chamber at a level below said gas inlet; and means for withdrawing gas from said collecting chamber through said gas outlet.

9. In a material separator of the type comprising an outer casing, an inverted conical inner casing within and spaced from said outer casing to define an annular collecting chamber therebetween communicating at its upper end with a separating chamber defined by said inner casing, circumferentially arranged openings intermediate the height of said inner casing and providing a gas connection between said chambers, solid material distributing means in the upper part of said separating chamber constructed and arranged to distribute solid material circumferentially of said separating chamber, draft producing means above said material distributing means and arranged to maintain a cyclic gas flow downwardly through the upper part of said collecting chamber, through said circumferentially arranged openings, and upwardly through the upper part of said separating chamber, whereby solid material fines will be carried into said collecting chamber and coarse material will drop along the inner side of said inner casing, the lower end of said inner casing constituting a tailings cone, an outlet for fines at the lower end of said collecting chamber, and an outlet for coarse material at the lower end of said tailings cone; means for treating the coarse material during its downward passage through said tailings cone comprising a gas inlet to said inner casing extending substantially throughout the entire circumference of said separating chamber at a level below said circumferentially arranged opening and above said tailings cone; a source of gas at a relatively high pressure connected to said inlet for discharge of gas at a relatively high velocity downward along the inner side of said tailings cone to effect an intimate heat exchange contact between the incoming gas and the descending coarse material in said tailings cone; and means forming a gas outlet in said collecting chamber.

10. A method of treating moisture-containing pulverizable material comprising feeding a mixture of partially pulverized material and an addition of untreated material to a separator; separating pulverized fines and fines of the untreated material from the remainder of the material; cascading an annular stream of the separated coarser particles through a heat exchange zone while subjecting the particles to the heat exchange action of a first and counterflowing stream of moisture absorbing gaseous medium; then further subjecting the annular stream of coarser particles to the scrubbing and heat exchange action of a second and relatively high velocity annular stream of moisture absorbing gaseous medium directed in the same general direction as and through said annular stream of the coarser particles, to remove fines from the coarser particles and absorb additional moisture therefrom; and separating such removed fines from such last named stream of gaseous medium.

11. A method of drying moisture-containing pulverizable material comprising separating coarse particles from the remainder of the material; cascading an annular stream of the separated coarse particles through a drying zone; subjecting the coarse particles, in the initial section of such zone, to the drying action of a first and counterflowing moisture absorbing gaseous medium; while the annular stream of coarse particles is cascading through a further section of such zone, directing a second and relatively high velocity annular stream of high temperature moisture absorbing gaseous medium through the stream of coarse particles to exert a further drying action upon the latter, and to remove fines from the coarser particles; and separating such removed fines from such last named stream of gaseous medium.

12. A method of drying moisture-containing pulverizable material comprising feeding a mixture of partially pulverized material and an addition of untreated material to a separator; separating pulverized fines and fines of the untreated material from the remainder of the material; cascading an annular stream of the separated coarser particles through a drying zone while subjecting the particles to the drying action of a first and counterflowing stream of moisture absorbing gaseous medium; and then further subjecting the annular stream of coarser particles to the scrubbing and drying action of a second and relatively high velocity annular stream of high temperature, moisture absorbing gaseous medium directed longitudinally through said annular stream of the coarser particles, to remove fines from the coarser particles and absorb additional moisture therefrom; and separating such removed fines from such last named stream of gaseous medium.

GEORGE B. EBERSOLE.

References Cited in the file of this patent

UNITED STATES PATENTS

| Number | Name | Date |
|---|---|---|
| 1,416,922 | Wood | May 23, 1922 |
| 1,499,724 | Fraser | July 1, 1924 |
| 1,611,791 | Stockton | Dec. 21, 1926 |
| 1,702,333 | Barthelmess | Feb. 19, 1929 |
| 1,965,643 | Hardgrove | July 10, 1934 |
| 2,070,650 | Crites | Feb. 16, 1937 |
| 2,128,166 | Schmidt | Aug. 23, 1938 |
| 2,188,430 | Fraser | Jan. 30, 1940 |
| 2,188,431 | Fraser | Jan. 30, 1940 |
| 2,350,737 | Eiben | June 6, 1944 |
| 2,522,704 | De Laval | Sept. 19, 1950 |

FOREIGN PATENTS

| Number | Country | Date |
|---|---|---|
| 464,928 | France | Apr. 3, 1914 |

OTHER REFERENCES

"Continuous dryer-classifier," Chemical Engineering, vol. 57, No. 5, June 1950, p. 110.